Dec. 26, 1944. R. H. TULL 2,365,786
REFRIGERATION APPARATUS
Filed Sept. 9, 1943 2 Sheets-Sheet 1

WITNESSES:

INVENTOR
ROBERT H. TULL.
BY
ATTORNEY

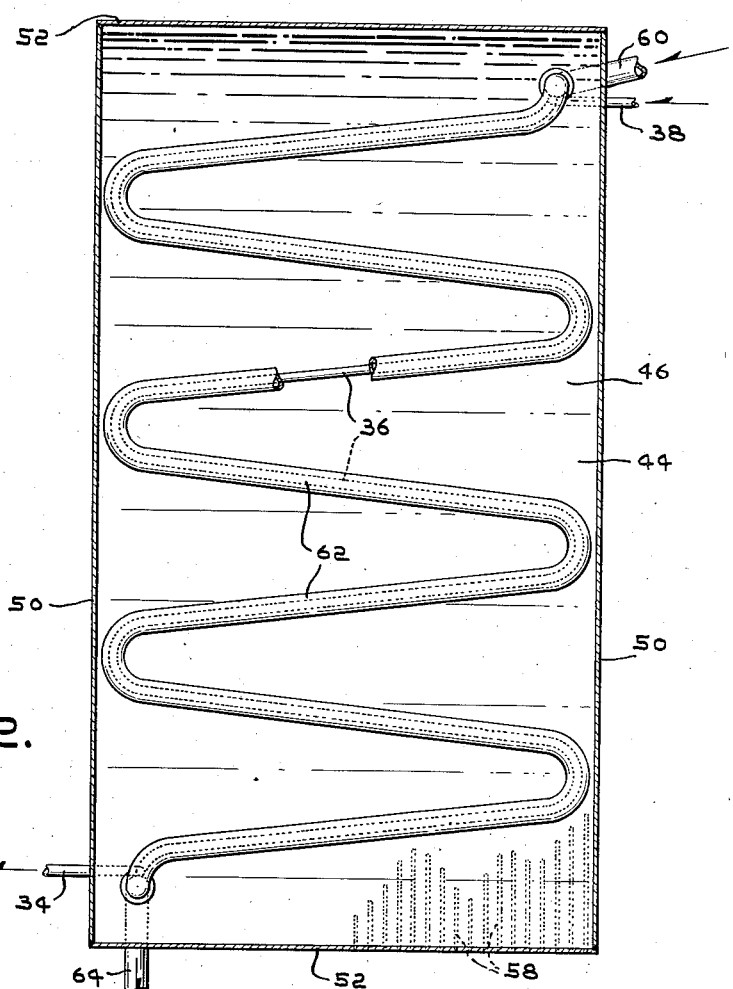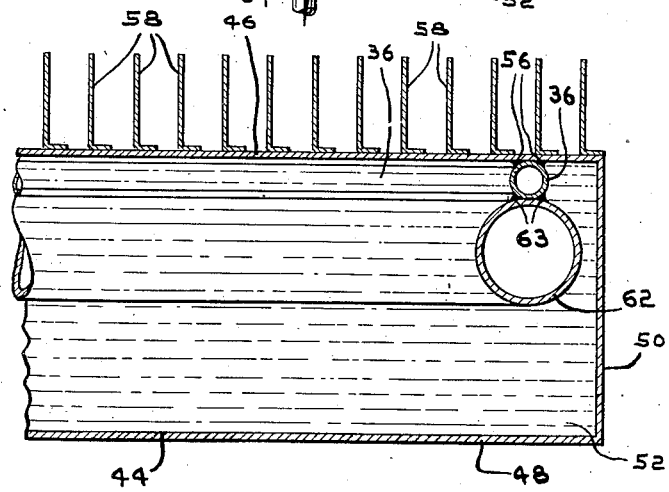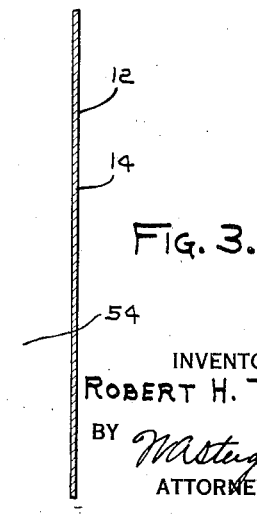

Patented Dec. 26, 1944

2,365,786

UNITED STATES PATENT OFFICE 2,365,786

REFRIGERATION APPARATUS

Robert H. Tull, Wilbraham, Mass., assignor to Westinghouse Electric & Manufacturing Company, East Pittsburgh, Pa., a corporation of Pennsylvania Application September 9, 1943, Serial No. 501,600

10 Claims. (Cl. 62—141)

My invention relates to refrigerating apparatus and more particularly to refrigerating apparatus adapted for use in connection with sanitary water coolers of the bubbler or fountain type, which dispense fresh, chilled water for drinking purposes.

One object of my invention is to produce an improved construction of a water cooler of the type set forth.

Another object of my invention is to produce an improved refrigerating apparatus for a water cooler or the like.

As is well known, about one-third of the chilled water dispensed by the bubbler or fountain type of water cooler is consumed and the remainder is wasted. The loss of this cooled water represents a considerable loss of refrigeration.

It is, therefore, a further object of my invention to produce an improved water cooler of the type set forth in which a substantial amount of the heretofore wasted refrigeration is reclaimed. This is accomplished by utilizing the waste cooled water for condensing the compressed refrigerant flowing through the condenser coil of the refrigerating apparatus.

I am aware that it has heretofore been proposed to use the waste cooled water for cooling the compressed refrigerant, as for instance, by placing the condenser coil in an open tank and conducting the waste cooled water from the bubbler water cooler into the tank, which was provided with an overflow leading to a disposal drain. From time to time, foreign objects, dust, dirt, etc., collect in the basin at the top of the water cooler, and are carried by the waste cooled water into the tank. This necessitates periodical removal and cleaning of the tank. In all types of water coolers, removing and cleaning the tank involves skilled and difficult labor and, in the case of built-in, or wall-mounted water coolers, the parts of which are not easily accessible the work is more difficult and time consuming.

It is, therefore, a still further object of my invention to produce an improved water cooler in which the above disadvantage is eliminated.

A still further object of my invention is to produce an improved refrigerating apparatus for a water cooler or the like, in which the condenser is also air cooled without the use of a blower, and in which the refrigerating effect of the waste cooled water is efficiently utilized.

These and other objects are effected by my invention as will be apparent from the following description and claims taken in accordance with the accompanying drawings, forming a part of this application, in which:

Fig. 2 is a vertical sectional view taken on line II—II of Fig. 1; and

Fig. 3 is an enlarged transverse sectional view taken on line III—III of Fig. 1.

Figure 1:
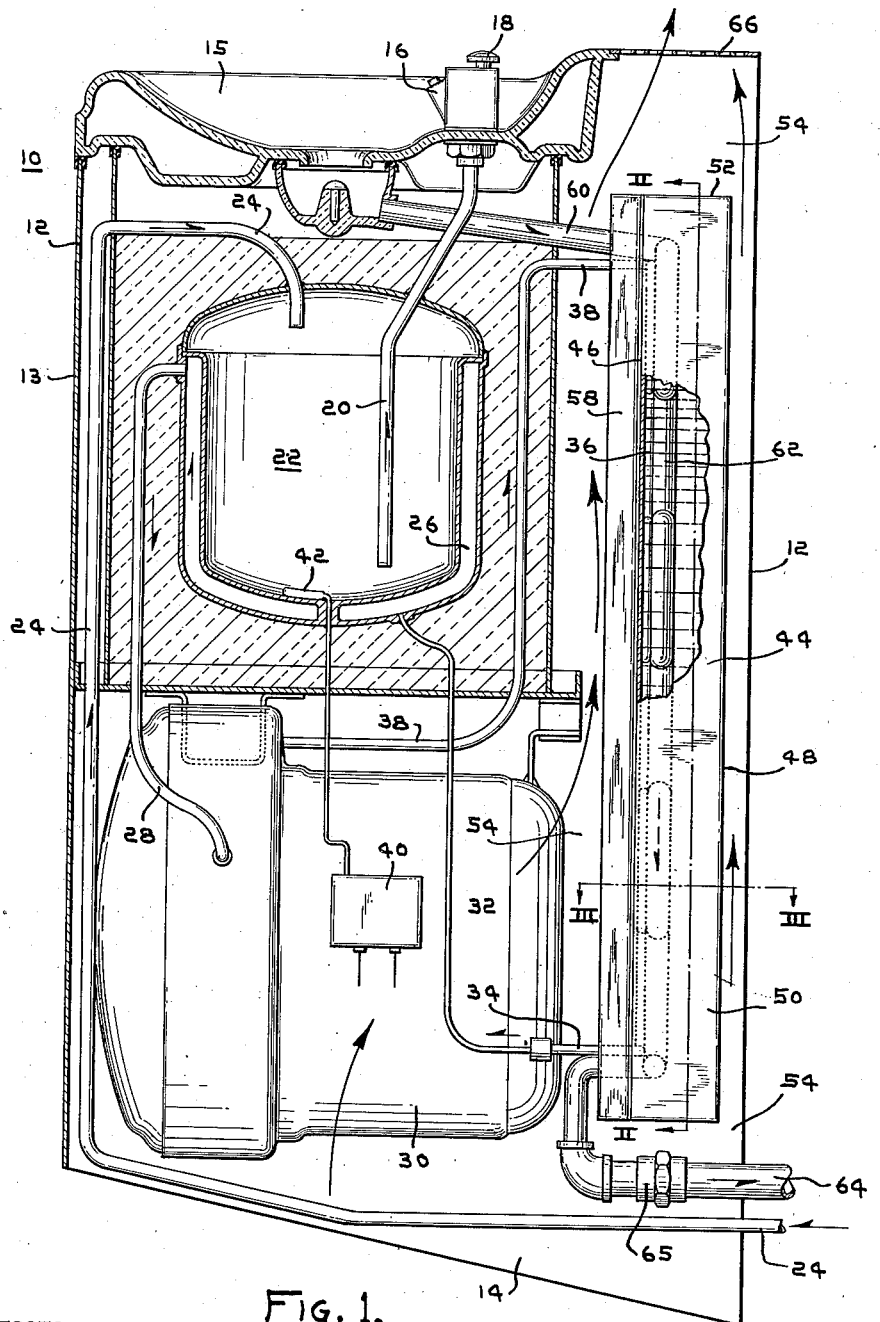
Fig. 1 is a view, partly in vertical section and partly in elevation, of a water cooler embodying my invention.

Referring now to the drawings more in detail, 10 designates a water cooler of the bubbler or fountain type, which is housed in an outer casing 12, formed of a front wall 13 and side walls 14. The lower end of the casing 12 is either open or provided with openings for admitting room air, and the upper end of the casing carries a basin or dished member 15 in which is mounted a spout 16. The back of the casing 12 may be left open and, in that event, the water cooler is usually placed against a wall. The spout 16 is controlled by any desired conventional valve mechanism operated by a push button or handle 18. The spout 16 is connected by a pipe 20 to the lower portion of a drinking water reservoir 22. The tank 22 is supplied with outside water by a pipe 24 leading from a water supply, such as a city main (not shown).

The reservoir 22 is cooled by an evaporator 26 which is connected at its upper end by a pipe 28, to the low pressure side of a motor compressor 30. The lower portion of the evaporator 26 is connected by a capillary tube 32 to the lower end 34 of a condenser coil 36. The upper end of the condenser coil 36 is connected through a pipe 38 to the high pressure side of the motor compressor 30. The flow of the refrigerant is indicated by the small arrows shown in Fig. 1. The operation of the motor compressor 30 is controlled by a switch 40, which is actuated by a bulb 42 responsive to the temperature of the water in the tank 22.

In order to eliminate the use of a blower I provide a heat storage body of a capacity sufficient to hold the heat of the hot compressed refrigerant during the maximum period of operation of the compressor. Also in order to aid in dissipating the heat stored in said body during and between successive cycles of operation of the compressor, I use the waste cooled water which is available every time the drinking fountain is used. In the embodiment illustrated, the heat conducting and dissipating body is shown as a tank 44 containing a suitable liquid which preferably has a low freezing point such as brine. The tank 44 is closed to the atmosphere so that it may be completely assembled and shipped ready for installation at the point of use. The use of brine in the tank guards against freezing in the event that it is exposed to cold weather such as when it is in storage or in transit. Also, as illustrated, the condenser coil and the waste cooled water coil are both disposed in heat exchange relation with respect to a wall of the tank and the liquid therein.

The tank 44 is provided with relatively wide side walls 46 and 48, relatively narrow end walls 50 and top and bottom walls 52 so that it is of a generally rectangular cross-section. As will be seen from Fig. 1, the tank 44 is totally enclosed within the casing 12 of the water cooler and is spaced from the wall of the casing as shown at 54 in Figs. 1 and 3.

The condenser coil 36 zig-zags downwardly across the larger dimension of the tank and is soldered or otherwise secured in contact with the inner side of the wall 46 as at 56. The wall 46 may be provided with heat-dissipating fins 58. The waste cooled water is conducted from the basin 15 through a pipe 60 into the upper end of a coil 62.

The coil 62 is preferably of a larger diameter than the condenser coil 36 and is soldered or otherwise secured in contact with the condenser coil 36 along its entire length, as best shown at 63 in Fig. 3. This arrangement provides maximum heat transfer between the cooled waste coil 62 and the condenser coil 36. Furthermore, the contiguous coils 36 and 62 constitute a greatly enlarged heat transfer surface for more effectively dissipating the heat of the compressed refrigerant in the condenser coil 36 by contact with the brine in the tank 44 and by contact with the wall 46 of the tank. The lower end of the coil 62 is connected to a disposal drain pipe 64 by any suitable coupling 65.

The upper end of the casing 12 is provided with a grilled or louvered portion 66 which preferably overlies the tank 44.

The space between the wall 46 of the tank and the rest of the machine compartment being open at the bottom and having communication with the atmosphere through the grill 66 produces a chimney effect whereby air heated by contact with the motor compressor unit and the tank 44 rises, by natural draft, in the direction of the big arrows in Fig. 1. This produces increased air circulation for effective cooling of the parts.

*Operation*

Every time the fountain is used, waste cooled water flows through the pipe 60 into the upper end of the coil 62, to be discharged at the lower end thereof into the disposal drain pipe 64. The cooled waste water is thus brought into heat transfer relationship with the condenser coil 36 and the brine or other liquid within the tank 44. The brine is thus cooled and its capacity to absorb heat is correspondingly increased.

As the compressor begins operation, the hot compressed refrigerant gas is pumped into the condenser coil 36, in which it is cooled and condensed. Its heat is absorbed mainly by the brine in the tank 44, the heat flowing through the coils 36 and 62. When waste water flows through the conduit 62 during the operation of the compressor, some of the heat from the refrigerant is absorbed directly by such waste water, the heat flowing through the coils 36 and 62. Still another portion of the heat of the compressed refrigerant is conducted or radiated from the fins 58 to the air stream, the heat flowing directly to the air stream through the continuous metal path including the coil 36, the solder connection 56, the wall 46 and the fins 58. As the operation continues, the temperature of the brine gradually increases due to the heat that it absorbs. Accordingly, the flow of heat from the brine to the walls of the tank and the fins 58 and to the waste water in the coil 62 gradually increases until operation of the compressor is terminated. At this time, the brine is at a relatively high temperature, representing the heat that it has absorbed during the operation of the compressor. The flow of heat from the brine to the air stream and the waste water continues while the compressor is not operating, and the brine temperature gradually decreases. Accordingly, when the compressor begins to operate, the brine is at a relatively low temperature, although it may still be somewhat above the ambient air temperature, so that it is again ready to absorb heat from the compressed refrigerant during the next period of operation of the compressor.

It will be noted that the flow of waste cooled water is progressively downward through the coil 62, so that any dirt or foreign particles that may enter the coil 62 are constantly flushed by the waste cooled water into the disposal drain 64. This reduces the need for cleaning the coil 62. However, the coil 62 can be flushed with a suction cup plunger when necessary, without being in any way disconnected. Because the tank 44 is closed, it remains free of dirt and sediment throughout its entire life.

It will also be seen the tank 44, or other heat storage body, is sufficient to store all the heat generated by compression of the refrigerant during any cycle of operation of the compressor and that between cycles of operation of the compressor this heat is dissipated into the air and absorbed by the waste cold water which flows through the cold water passage 62 every time the water cooler is used.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. Refrigerating apparatus for a water cooler of the bubbler type which includes a drinking water reservoir, a valve-controlled dispensing spout leading from said reservoir, and a waste cold water outlet, said apparatus comprising an evaporator, a motor-compressor, a condenser coil, a sealed heat exchange tank containing a heat exchange fluid in which said condenser coil is immersed, and a cooling coil also immersed in said heat exchange fluid and connected at one end thereof to said outlet and the other end thereof being adapted for connection to a disposal pipe.

2. Refrigerating apparatus for a water cooler of the bubbler type which includes a drinking water reservoir, a valve-controlled dispensing spout leading from said reservoir, and a waste cold water outlet, said apparatus comprising an evaporator, a motor-compressor, a condenser coil, a sealed heat exchange tank enclosing said condenser coil and containing a heat exchange fluid in which said condenser coil is immersed, and a cooling coil also immersed in said heat exchange fluid and connected at one end thereof to said outlet and the other end thereof, being adapted for connection to a disposal pipe, said cooling coil being secured in contiguous heat exchange relation to said condenser coil.

3. The structure recited in claim 2 in which, one of said coils is secured in contiguous heat exchange relation with a wall of said tank.

4. The structure recited in claim 2 in which said cooling coil is connected at its upper end to said cold water outlet and at its lower end to said disposal pipe, said cooling coil being so constructed and arranged that the flow of waste cold water therein is in a progressively downward direction into said disposal pipe.

5. The structure recited in claim 2 in which said water cooler is enclosed in an outer casing having upper and lower openings, said upper and lower openings being so arranged as to cause a current of air to circulate upwardly in heat exchange relationship to said heat exchange tank.

6. In a refrigerated water cooler of the bubbler type which includes a valve-controlled dispensing spout, an evaporator, a compressor and a refrigerant condensing chamber, the improvement which comprises means for utilizing waste cold water from said spout for cooling said refrigerant condensing chamber, said means including a heat storage body disposed in heat exchange relation to said condensing chamber, a waste cold water passage disposed in heat exchange relation to said body, and means conducting waste cold water to one end of said passage, the other end of said passage discharging said waste cold water outside said body, and said passage being so arranged that the flow of waste cold water therein is in a progressively downward direction, so that the waste cold water drains from said passage.

7. A drinking fountain of the bubbler type comprising refrigerating apparatus for cooling the water dispensed from said fountain, said apparatus including a refrigerant gas condensing chamber, and means for utilizing waste cold water from said fountain for cooling said condensing chamber, said means comprising a tank having a heat storage fluid therein, said condensing chamber being in said fluid, a coil in said fluid, and means for conducting said waste cold water to the upper end of said coil, the lower end of said coil discharging said waste cold water outside said tank, and said coil being so arranged that the flow of waste cold water therethrough is in a progressively downward direction from the upper to the lower end of said coil.

8. A refrigerant condenser for use in a drinking fountain, said condenser comprising a closed tank adapted to contain a heat storage fluid, heat-dissipating fins carried by the exterior of a wall of said tank, a condensing chamber disposed within said tank and secured in contact with the interior of said wall, whereby a portion of the heat of said condensing chamber is dissipated directly through said wall and said fins, a cooling coil disposed within said tank and secured in contact with said condensing chamber, and means for conducting waste cold water from said fountain into one end of said coil, the other end of said coil discharging said waste cold water outside said tank, and said coil being so arranged that the flow of waste cold water therethrough extracts heat from said fluid and said condenser.

9. A refrigerant condenser for use in a drinking fountain, said condenser comprising a tank adapted to contain a heat storage fluid, heat-dissipating fins carried by the exterior of a wall of said tank, a condensing coil disposed within said tank and secured in contact with the interior of said wall, whereby a portion of the heat of said condensing coil is dissipated directly through said wall and said fins, a cooling coil disposed within said tank and secured in contact with said condensing coil, said cooling coil being spaced from the walls of said tank, and means for conducting waste cold water from said fountain into one end of said cooling coil, the other end of said coil discharging said waste cold water outside said tank, and said coil being so arranged that the flow of waste cold water therethrough extracts heat from said fluid and said condensing coil.

10. The structure recited in claim 9 in which the flow of waste cold water in said cooling coil is in a progressively downward direction.

ROBERT H. TULL.